(12) United States Patent
Imaizumi (10) Patent No.: US 8,860,724 B2
(45) Date of Patent: Oct. 14, 2014

(54) INFORMATION PROCESSING APPARATUS, INFORMATION PROCESSING METHOD, AND PROGRAM STORAGE MEDIUM

(75) Inventor: Satoshi Imaizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 12/832,492

(22) Filed: Jul. 8, 2010

(65) Prior Publication Data

US 2011/0007070 A1 Jan. 13, 2011

(30) Foreign Application Priority Data

Jul. 13, 2009 (JP) .................................. 2009-165122

(51) Int. Cl.
*G06T 15/00* (2011.01)
*G06T 17/00* (2006.01)
*G06G 5/00* (2006.01)
*G06T 15/50* (2011.01)
*G06T 15/10* (2011.01)
*G06T 11/00* (2006.01)
*H04N 1/407* (2006.01)
*H04N 1/60* (2006.01)

(52) U.S. Cl.
CPC ............... *G06T 15/00* (2013.01); *G06T 11/001* (2013.01); *H04N 1/4078* (2013.01); *H04N 1/6033* (2013.01)
USPC ........... 345/426; 345/419; 345/424; 345/606; 345/622

(58) Field of Classification Search
CPC ........... G06T 5/001; G06T 5/40; G06T 5/008; G06T 15/60
USPC .......................... 345/419, 424, 622, 426, 606
See application file for complete search history.

(56) References Cited

U.S. PATENT DOCUMENTS 5,867,166 A * 2/1999 Myhrvold et al. ............ 345/419

FOREIGN PATENT DOCUMENTS

JP 11-0353495 A 12/1999

OTHER PUBLICATIONS

Pete Bauer, "Working with Gradients in Photoshop 6", Jul 29, 2004; http://www.webdesign.org/photoshop/photoshop-basics/working-with-gradients-in-photoshop-6.190.html; 1-5.*

* cited by examiner

*Primary Examiner* — Ke Xiao
*Assistant Examiner* — Robert Craddock
(74) *Attorney, Agent, or Firm* — Canon USA, Inc. IP Division (57) ABSTRACT

An apparatus includes a calculation unit configured to calculate, based on data on gradation included in two-dimensional graphics data, position information about color reference points of the gradation and shape information about an object to which the gradation is applied, and a conversion unit configured to convert the two-dimensional graphics data into three-dimensional graphics data by calculating a rectangle encircling the object based on the calculated shape information, dividing the rectangle into a plurality of triangles as three-dimensional polygons, and designating colors of the color reference points with respect to vertices of each three-dimensional polygon based on position information about each three-dimensional polygon and the position information about the calculated color reference points.

18 Claims, 7 Drawing Sheets

```
<?xml version=" 1.0" encoding=" utf-8" ?>
<svg xmlns=" http://www.w3.org/2000/svg"
    width=" 320" height=" 240" >
<defs>
<linearGradient id=" Grad" gradientUnits=" userSpaceOnUse"
    x1=" 80" y1=" 100" x2=" 180" y2=" 200" >
<stop offset=" 0% stop-color=" #F00" />
<stop offset=" 100% stop-color=" #00F" />
</linearGradient>
</defs>
<ellipse cx=" 160" cy=" 120" rx=" 150" ry=" 110"
    fill=" uri (#Grad)" />
</svg>
```

INFORMATION PROCESSING APPARATUS, INFORMATION PROCESSING METHOD, AND PROGRAM STORAGE MEDIUM

BACKGROUND OF THE INVENTION

1. Field of the Invention

The present invention relates to an information processing apparatus, an information processing method, and a program storage medium.

2. Description of the Related Art

Heretofore, it has been difficult to handle two-dimensional graphics data and three-dimensional graphics data simultaneously on a single apparatus. As a solution to this issue, Japanese Patent Application Laid-Open No. 11-353495 discusses a technology that enables simultaneous handling of both two-dimensional graphics data and three-dimensional graphics data on one apparatus.

However, in Japanese Patent Application Laid-Open No. 11-353495, the apparatus only discriminates between an instruction to process two-dimensional graphics data and an instruction to process three-dimensional graphics data, and switches the rendering processing functions between the two types of data according to a discrimination result. For this reason, in the technology discussed in Japanese Patent Application Laid-Open No. 11-353495, an apparatus, which has a rendering processing function for three-dimensional graphics data but does not have a rendering processing function for two-dimensional graphics data, is unable to process two-dimensional graphics data.

When provided with a hardware rendering processing function to render three-dimensional graphics data, the apparatus is certainly provided with a more elaborate accelerator capable of high-speed rendering than in apparatuses which include a hardware rendering processing function to render two-dimensional graphics data.

There are differences between gradation in two-dimensional graphics and gradation in three-dimensional graphics, including a difference in color designation method, thus making simple cross-dimensional mapping difficult.

SUMMARY OF THE INVENTION

According to an aspect of the present invention, an apparatus includes a calculation unit configured to calculate, based on data on gradation included in two-dimensional graphics data, position information about color reference points of the gradation and shape information about an object to which the gradation is applied, and a conversion unit configured to convert the two-dimensional graphics data into three-dimensional graphics data by calculating a rectangle encircling the object based on the calculated shape information, dividing the rectangle into a plurality of triangles as three-dimensional polygons, and designating colors of the color reference points with respect to vertices of each three-dimensional polygon based on position information about each three-dimensional polygon and the position information about the calculated color reference points.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
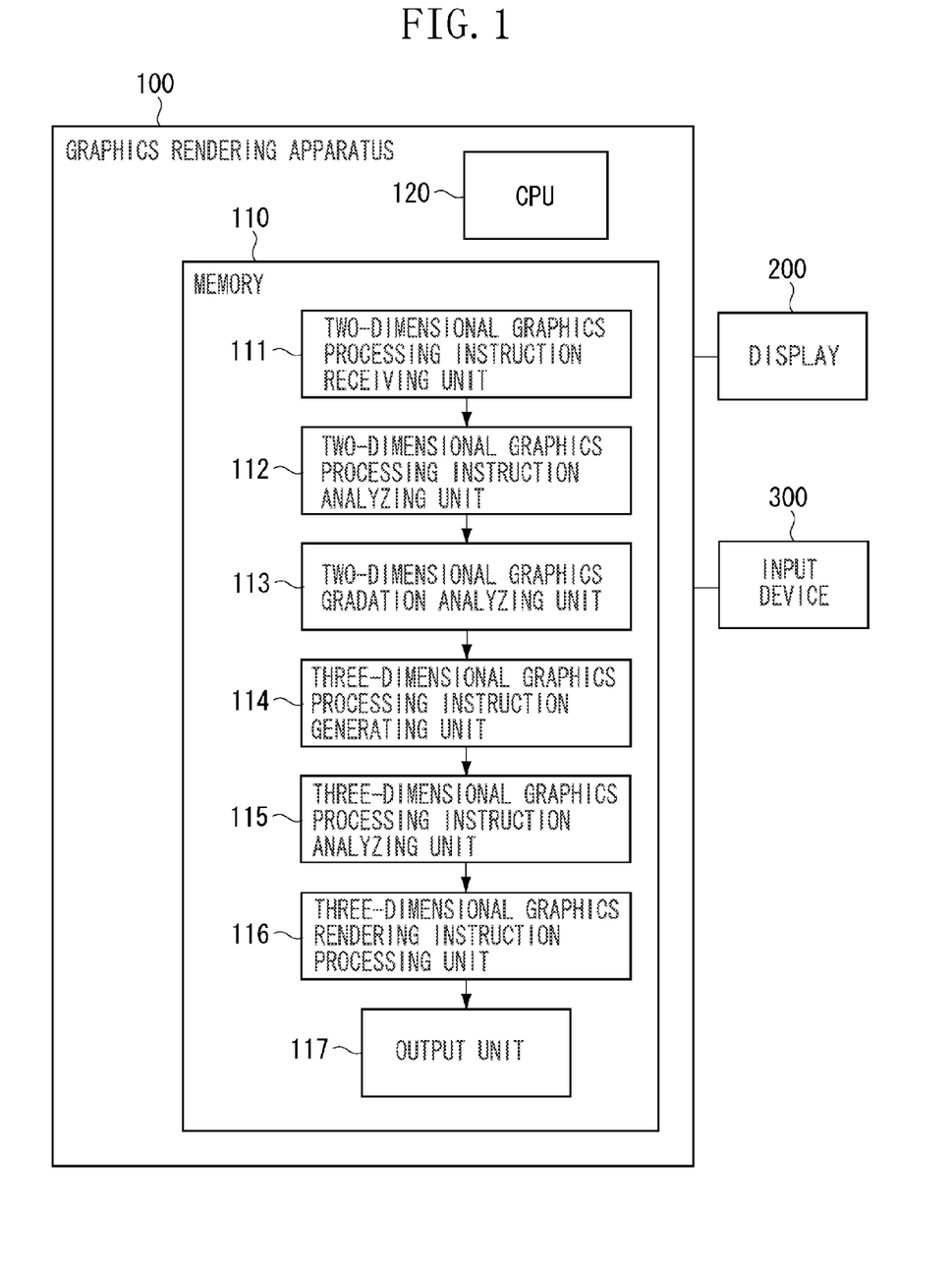
FIG. 1 is a diagram illustrating an example of a configuration of a graphics rendering apparatus as an example of an information processing apparatus (computer) according to a first exemplary embodiment of the present invention.

FIG. 1 is a diagram illustrating an example of a graphics rendering apparatus as an example of an information processing apparatus (computer) according to a first exemplary embodiment of the present invention.

In FIG. 1, the graphics rendering apparatus includes a memory 110 and a CPU 120. The graphics rendering apparatus 100 is connected to a display 200 and an input device 300.

Based on a program stored in the memory 110, the CPU 120 performs the functions in the memory 110, illustrated in FIG. 1 to give a conceptual view of the apparatus, and executes items of processing of flowcharts to be described below.

A two-dimensional graphics processing instruction receiving unit 111 receives two-dimensional graphics data as a two-dimensional processing instruction.

A two-dimensional graphics processing instruction analyzing unit 112 analyzes two-dimensional graphics data received by the two-dimensional graphics processing instruction receiving unit 111.

Based on an analysis result of the two-dimensional graphics processing instruction analyzing unit 112, a two-dimensional graphics gradation analyzing unit 113 obtains data on two-dimensional graphics gradation included in the two-dimensional graphics data. The two-dimensional graphics gradation analyzing unit 113 analyzes data on the obtained two-dimensional graphics gradation (two-dimensional graphics gradation).

Based on an analysis result of the two-dimensional graphics gradation analyzing unit 113, a three-dimensional graphics processing instruction generating unit 114 generates three-dimensional graphics data as a three-dimensional graphics processing instruction.

A three-dimensional graphics processing instruction analyzing unit 115 analyzes three-dimensional graphics data generated by the three-dimensional graphics processing instruction generating unit 114 or three-dimensional graphics data received as a three-dimensional processing instruction from an external device.

Based on a analysis result of the three-dimensional graphics processing instruction analyzing unit 115, a three-dimensional graphics rendering instruction processing unit 116 performs processing related to three-dimensional graphics rendering. An output unit 117 outputs a processing result of the three-dimensional graphics rendering instruction processing unit 116 finally to the display 200, for example.

Figure 2:
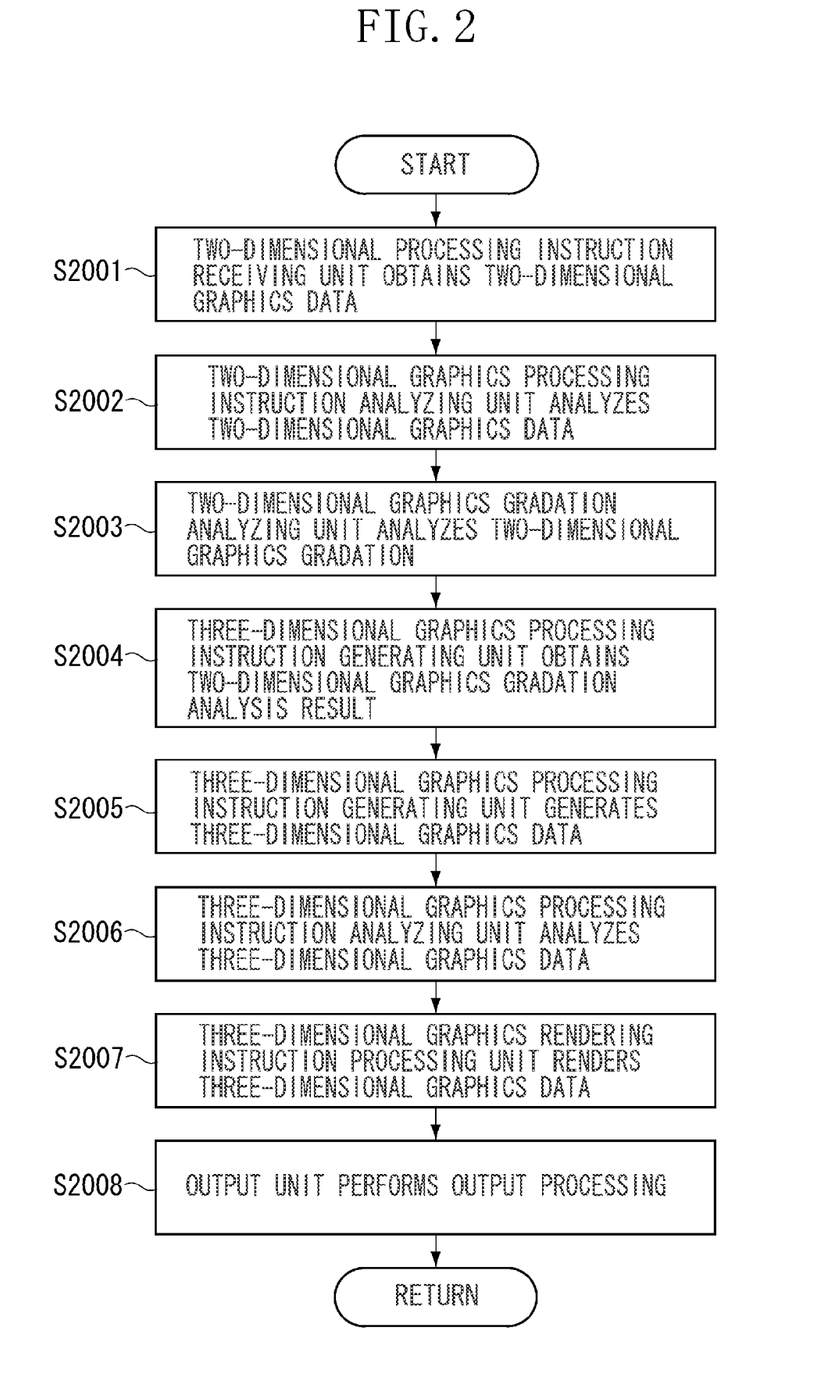
FIG. 2 is a flowchart illustrating a flow of processing steps according to the first exemplary embodiment of the present invention.
Figure 3:
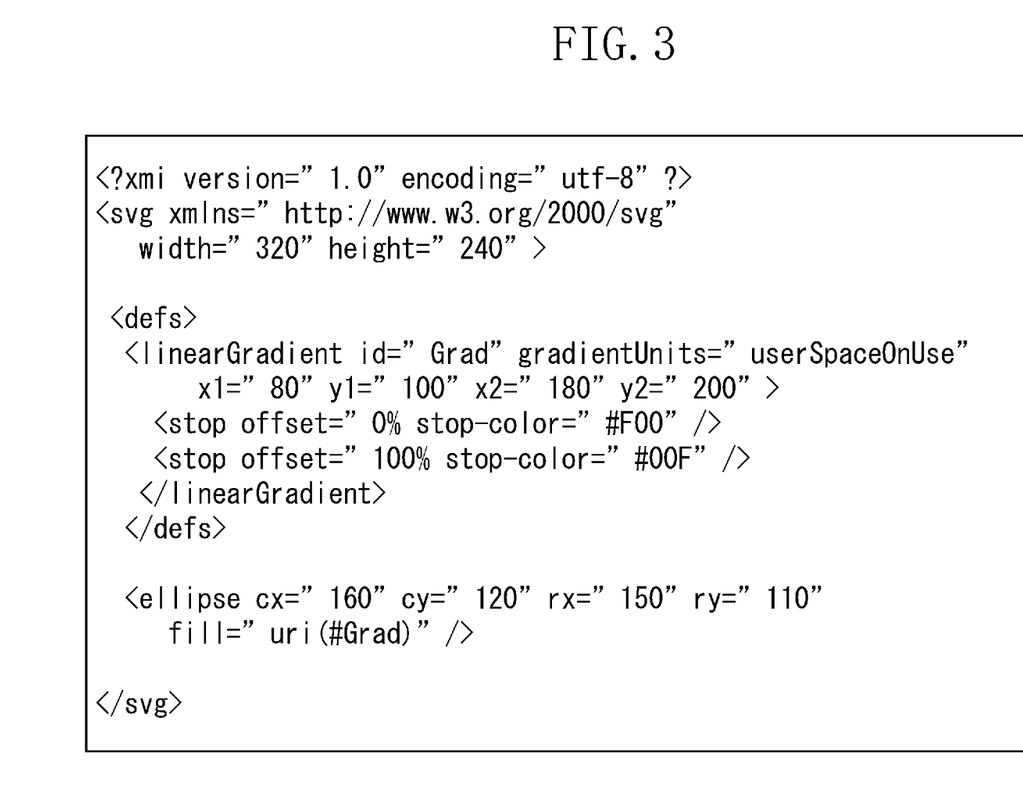
FIG. 3 is a diagram illustrating an example of two dimensional graphics data.

FIG. 2 is a flowchart illustrating a flow of processing in the present exemplary embodiment. In step S2001, the two-dimensional graphics processing instruction receiving unit 111 receives two-dimensional graphics data. FIG. 3 is a diagram illustrating an example of two-dimensional graphics data. As illustrated in FIG. 3, two-dimensional graphics data is vector data. In the example in FIG. 3, two-dimensional graphics data is described in scalable vector graphics (SVG) format including data for linear gradation (two-dimensional gradation).

In step S2002, the two-dimensional graphics processing instruction analyzing unit 112 analyzes two-dimensional graphics data as illustrated in FIG. 3, received in step S2001, and identifies data on linear gradation included in two-dimensional graphics data.

In step S2003, the two-dimensional graphics gradation analyzing unit 113 analyzes data (gradation data) on linear gradation identified in step S2002. The two-dimensional graphics gradation analyzing unit 113 calculates a direction of linear gradation as a direction defined by a start point (80, 100) and an end point (180, 200) according to x1, x2, y1, and y2 attributes of "linearGradient" element.

The two-dimensional graphics gradation analyzing unit 113 determines a color of linear gradation as gradation that gradually changes from a red color starting at a red start point to a blue color ending at a blue end point.

The two-dimensional graphics gradation analyzing unit 113 determines that linear gradation is to be applied to an object encircled by an ellipse with the center at (160, 120), X-axis radius of 150, and Y-axis radius of 110 according to cx, xy, rx, and ry attributes of "ellipse" element.

Regarding areas outside of coordinates designated by "linearGradient" element, the two-dimensional graphics gradation analyzing unit 113 determines that the outer area on the start point side should be drawn in a color at the start point and the outer area on the end point side should be drawn in a color at the end point in the case of two-dimensional graphics data illustrated in FIG. 3.

Figure 4:
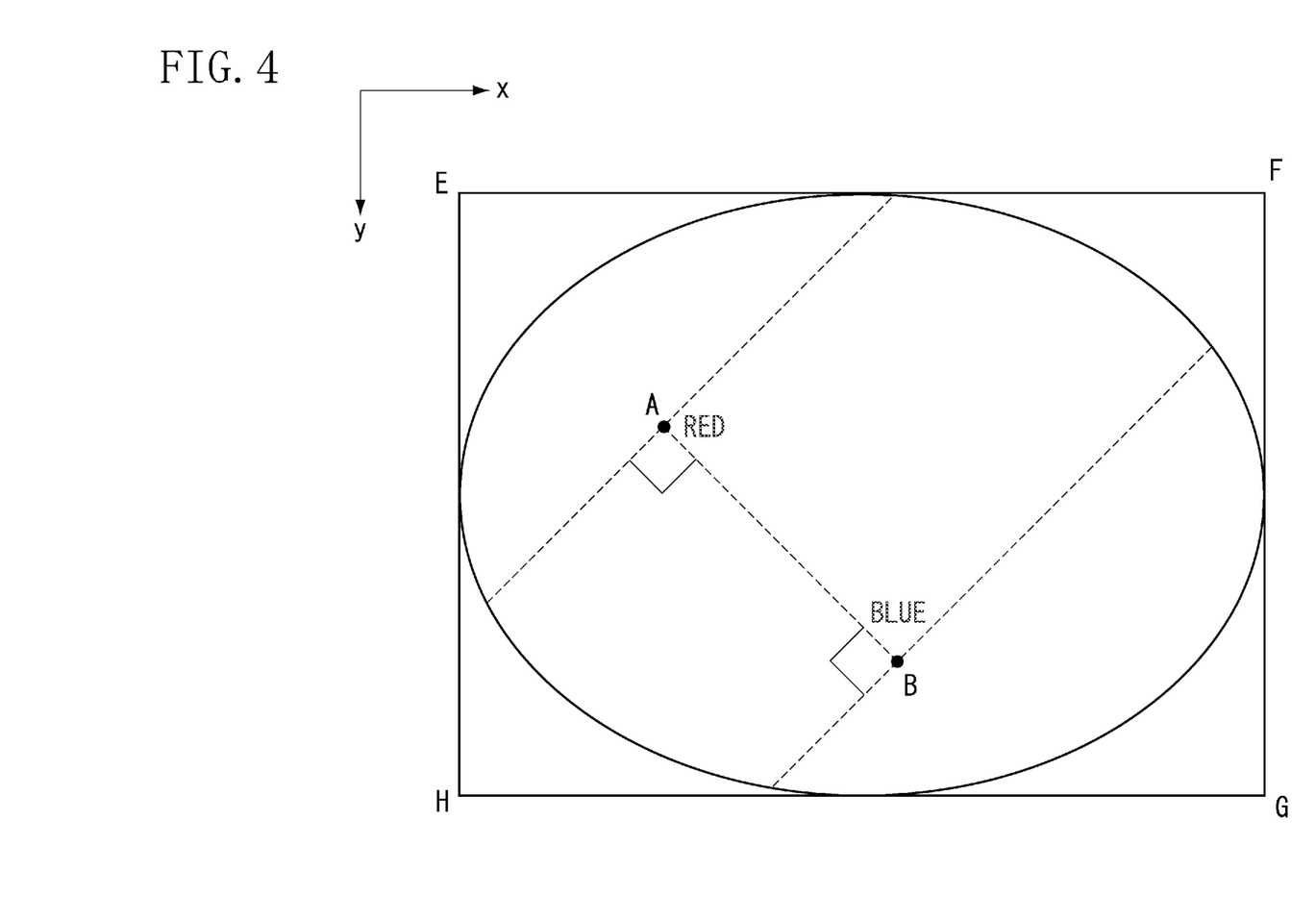
FIG. 4 is a diagram illustrating an example of graphic obtained by rendering two-dimensional graphics data illustrated in FIG. 3.

Results of rendering of the two-dimensional graphics data in FIG. 3 are expressed in FIG. 4. FIG. 4 is a diagram illustrating an example of graphic obtained by rendering the two-dimensional graphics data illustrated in FIG. 3. In FIG. 4, this coordinate system has the X-axis and the Y-axis. In an internal area of the ellipse of FIG. 4, an area extending between an elliptical arc portion facing point E and a dotted line, which passes through point A and which is perpendicular to a line segment AB, is filled in red. On the other hand, an area between an elliptical arc portion facing point G and a dotted line, which passes through point B and which is perpendicular to the line segment AB, is filled in blue. The remaining internal area of the ellipse is filled with a gradation changing from red to blue.

Figure 5:
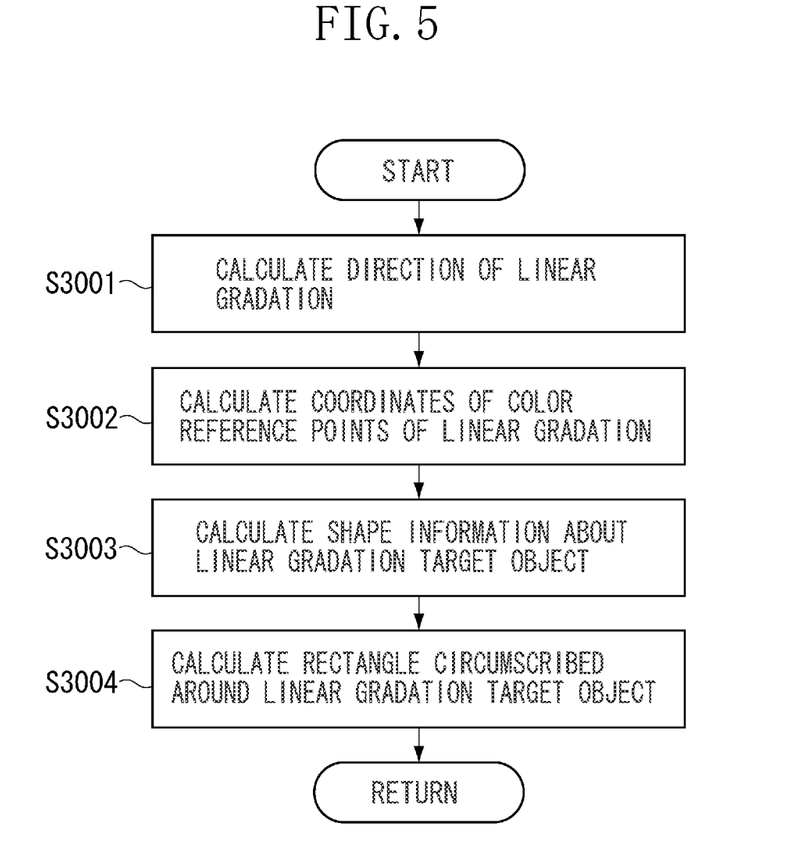
FIG. 5 is a flowchart illustrating details of processing in step S2003 in FIG. 2.

Details of processing in step S2003 will be described with reference to FIGS. 4 and 5. FIG. 5 is a flowchart illustrating details of processing in step S2003.

In step S3001, the two-dimensional graphics gradation analyzing unit 113 obtains a direction of linear gradation. The two-dimensional graphics gradation analyzing unit 113 determines that the direction of gradation is a direction from point A to point B as described above. Next, in step S3002, the two-dimensional graphics gradation analyzing unit 113 obtains coordinates as an example of position information about a color reference point. In two-dimensional graphics data illustrated in FIG. 3, color reference points of linear gradation are set only at end points. Therefore, the two-dimensional graphics gradation analyzing unit 113 obtains coordinates of color reference points as point A (80, 100) and point B (180, 200) in FIG. 4.

In step S3003, the two-dimensional graphics gradation analyzing unit 113 obtains shape information about a target object of linear gradation according to cx, cy, rx, and ry attributes. In other words, the two-dimensional graphics gradation analyzing unit 113 obtains path information of an ellipse with the center at (160, 120), X-axis radius of 150, and Y-axis radius of 110 as shape information about a target object of linear gradation.

In step S3004, the two-dimensional graphics gradation analyzing unit 113 obtains a rectangle circumscribed around the linear gradation target object (a quadrangle EFGH in FIG. 4) based on the shape information.

Referring back to FIG. 2, in step S2004, the three-dimensional graphics processing instruction generating unit 114 obtains an analysis result (information as a result of calculations by processing illustrated in FIG. 5) from the two-dimensional graphics gradation analyzing unit 113. In step S2005, the three-dimensional graphics processing instruction generating unit 114 generates three-dimensional graphics data based on the obtained analysis result.

Figure 6:
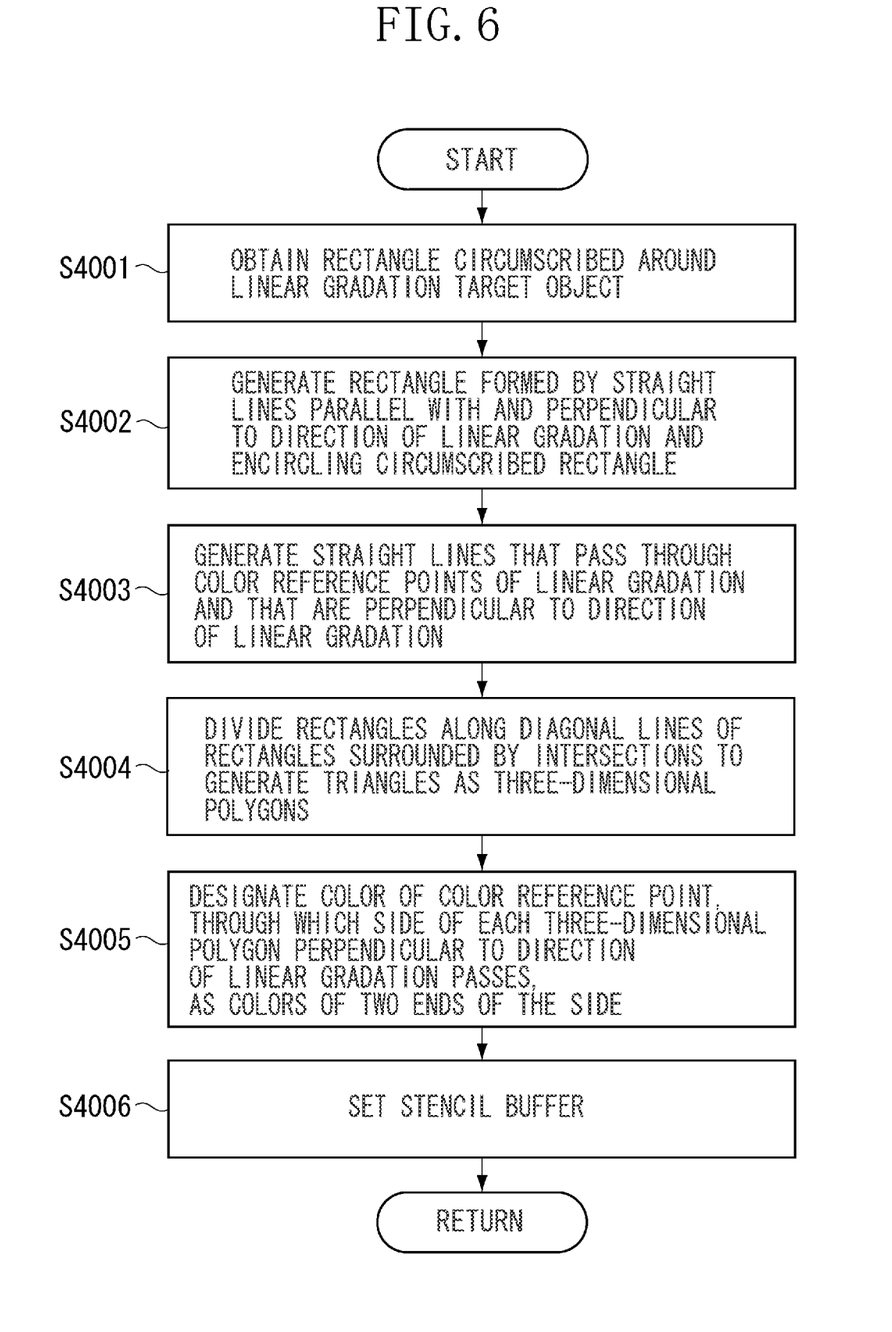
FIG. 6 is a flowchart illustrating details of processing in step S2005 in FIG. 2.
Figure 7:
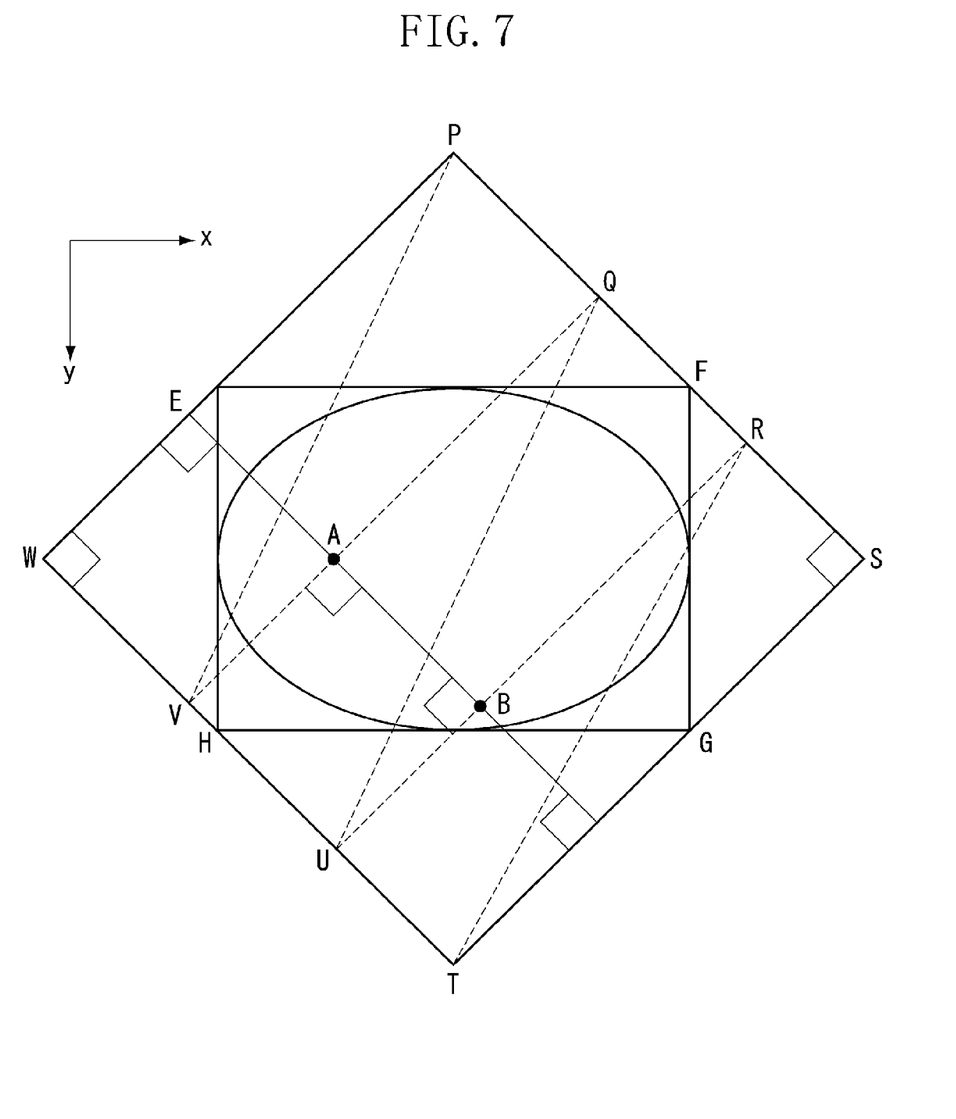
FIG. 7 is a diagram illustrating processing in step S2005 in FIG. 2.

Details of processing in FIG. 5 will be described with reference to FIGS. 6 and 7. FIG. 6 is a flowchart illustrating details of processing in step S2005 in FIG. 2. FIG. 7 is a diagram illustrating the processing in step S2005.

As illustrated in FIG. 7, the coordinate system has the X-axis and the Y-axis. The line segment AB and the quadrangle EFGH in FIG. 4 correspond to the line segment AB and the quadrangle EFGH in FIG. 7. The three-dimensional graphics processing instruction generating unit 114 obtains a rectangle (a quadrangle EFGH in the example of FIG. 7) circumscribed around the target object of linear gradation according to the obtained analysis result.

In step S4002, the three-dimensional graphics processing instruction generating unit 114, based on, for example, the direction of linear gradation, included in the obtained analysis result, generates a rectangle encircling the circumscribed rectangle and formed by straight lines parallel with and perpendicular to the above-mentioned direction (rectangle calculation). More specifically, the three-dimensional graphics processing instruction generating unit 114 first obtains a gradient of the direction of linear gradation. Because point A is at (80, 100) and point B is at (180, 200), the three-dimensional graphics processing instruction generating unit 114 can find the gradient to be 1.

If the gradient is a positive value or parallel with the Y-axis, the three-dimensional graphics processing instruction generating unit 114 generates two straight lines which pass through a point with a maximum X-coordinate and a maximum Y-coordinate or a point with a minimum X-coordinate and a minimum Y-coordinate out of the four vertices of the circumscribed rectangle, and which are perpendicular to the gradient. Then, the three-dimensional graphics processing instruction generating unit 114 generates straight lines which pass through the remaining vertices and which are parallel with the gradient.

On the other hand, when the gradient has a negative value, the three-dimensional graphics processing instruction generating unit 114 generates two straight lines, which pass either a point with a maximum X-coordinate and a maximum Y-coordinate or a point with a minimum X-coordinate and a minimum Y-coordinate out of the four vertices of the circumscribed rectangle, and which are parallel with the gradient. Then, the three-dimensional graphics processing instruction generating unit 114 generates straight lines which pass through the remaining vertices and which are perpendicular to the gradient.

In the example of the present embodiment, since the gradient is 1 and a positive value, the three-dimensional graphics processing instruction generating unit 114 generates straight lines, which pass either point G with a maximum X-coordinate and a maximum Y-coordinate or point E with a minimum X-coordinate and a minimum Y-coordinate, and which are perpendicular to the straight line AB having the gradient, and straight lines, which pass either point F or point H as the remaining vertices, and which are parallel with the straight line AB. A rectangle obtained as described above is a quadrangle PSTW.

In step S4003, the three-dimensional graphics processing instruction generating unit 114 generates straight lines which pass through the color reference points of linear gradation and which are perpendicular to the linear gradation direction (straight line calculation). In FIG. 7, because the color reference points of the color gradation are points A and B, the straight lines generated by the three-dimensional graphics processing instruction generating unit 114 are a straight line QV and a straight line RU. By the processing up to this stage, the quadrangle PSTW has been divided into quadrangles PQVW, QRUV, and RWTU.

In step S4004, the three-dimensional graphics processing instruction generating unit 114 further divides the rectangles (quadrangles) along diagonal lines of the rectangles to generate a plurality of triangles as three-dimensional polygons (generation of three-dimensional polygons). In the example of FIG. 7, the triangles thus generated are a triangle PWV, a triangle PQV, a triangle QVU, a triangle QRU, a triangle RUT, and a triangle RST.

In step S4005, the three-dimensional graphics instruction generating unit 114 designates a color of color reference point, through which one side of each three-dimensional polygon, which is perpendicular to the direction of the linear gradation, passes, as colors of two ends of the side (color designation). Because vertices of the triangle PWV and the triangle PQV are all outside of the start point of the linear gradation, the three-dimensional graphics processing instruction generating unit 114 designates red, which is the start point color, for those vertices. In the triangle QVU, because the straight line QV passes through the start point of the linear gradation, the three-dimensional graphics processing instruction generating unit 114 designates red, which is the reference color at the start point, for the vertices Q and V. In the triangle QRU, because the straight line RU passes through the end point of the linear gradation, the three-dimensional graphics processing instruction generating unit 114 designates blue, which is the reference color at the end point, for the vertices R and U. For the vertices of the triangle RUT and the triangle RST, because those vertices are all outside of the linear gradation, the three-dimensional graphics processing instruction generating unit 114 designates blue, which is the color of the end point.

In step S4006, the three-dimensional graphics processing instruction generating unit 114 sets a stencil buffer based on shape information about a target object of linear gradation included in the obtained analysis result. The stencil buffer plays a role of a mask to determine whether to render graphics data in actual rendering processing. If three-dimensional graphics data generated by processing in steps S4001 to S4005 is rendered without setting a stencil buffer, the entire quadrangle PSTW is drawn. Because only the inside of the ellipse is to be actually drawn, the three-dimensional graphics processing instruction generating unit 114 sets a stencil buffer for the shape of the ellipse. With the processing described above, information about three-dimensional graphics data necessary for drawing of three-dimensional graphics is generated.

Referring back to FIG. 2, in step S2006, the three-dimensional graphics processing instruction analyzing unit 115 analyzes the three-dimensional graphics data generated in step S2005. In step S2007, the three-dimensional graphics rendering instruction processing unit 116 executes rendering of the three-dimensional graphics data based on a result of analysis in step S2006. Finally, in step S2008, the output unit 117 performs output processing.

With the processing described above, the graphics rendering apparatus 100 can convert two-dimensional graphics data including data on linear gradation into three-dimensional graphics data while preserving the rendering result, and can render graphics data in the three-dimensional rendering system.

In the present exemplary embodiment, the graphics rendering apparatus 100 generates three-dimensional polygons in a rectangle, which encircles a rectangle circumscribed around an applicable target object of linear gradation and which is encircled by straight lines parallel with and perpendicular to the linear gradation. However, three-dimensional polygons may be generated by some other method.

In the first exemplary embodiment, the graphics rendering apparatus 100 generates three-dimensional polygons in such a manner that the polygons pass the color reference points of the linear gradation, but the three-dimensional polygons may be generated by some other method. For example, the graphics rendering apparatus 100 may analyze and obtain colors of optional points between the color reference points of the linear gradation, and may generate three-dimensional polygons in such a manner that the polygons pass through those points.

The first exemplary embodiment has been described on the assumption that the three-dimensional graphics processing instruction analyzing unit 115 and the three-dimensional graphics rendering instruction processing unit 116 are implemented by software. In a second exemplary embodiment of the present invention, those units may be hardware devices mounted in the graphics rendering apparatus 100.

As has been described referring to the issue to be solved by the present invention, in the hardware related to rendering processing of three-dimensional graphics data, improvement has been made more notably in the hardware accelerator capable of high-speed rendering than in the hardware in the rendering processing of two-dimensional graphics data. Therefore, in the second exemplary embodiment, the graphics rendering apparatus 100 converts two-dimensional graphics data into three-dimensional graphics data as in the first exemplary embodiment. The graphics rendering apparatus 100 can perform high-speed rendering of three-dimensional graphics data obtained by the above-mentioned conversion by using the accelerator and hardware devices (such as the units 115 and 116 described above) for three-dimensional graphics data.

In other words, according to the second exemplary embodiment, a requirement for high-speed rendering of two-dimensional graphics data can be met only by mounting hardware for three-dimensional graphics without mounting hardware for rendering of two-dimensional graphics.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-165122 filed Jul. 13, 2009, which is hereby incorporated by reference herein in its entirety.

What is claimed is:

1. An apparatus comprising:
an analyzing unit configured to obtain information of a color changing direction of gradation of two-dimensional graphics gradation data and color information about color reference points of the gradation; and
a conversion unit configured to convert the two-dimensional graphics gradation data into three-dimensional graphics gradation data,
wherein the conversion unit converts the two-dimensional graphics gradation data into the three-dimensional graphics gradation data using the direction information of gradation and the color information about color reference points, and
wherein the conversion unit generates a rectangle encircling a circumscribed rectangle using lines perpendicular and using lines parallel to the color changing direction of the gradation, and converts the two-dimensional graphics gradation data into the three-dimensional graphics gradation data using the rectangle.

2. The apparatus according to claim 1,
wherein the analyzing unit further obtains shape information about an object to which the two-dimensional graphic gradation is applied, and
wherein the conversion unit sets an area where graphics gradation data is drawn by gradation out of the three-dimensional graphics gradation data obtained by conversion, based on the shape information.

3. The information processing apparatus according to claim 1, further comprising a rendering processing unit configured to render the three-dimensional graphics gradation data.

4. The apparatus according to claim 1, wherein a triangle generated using the direction information of gradation is used as a three-dimensional polygon, and the conversion unit converts the two-dimensional graphics gradation data into the three-dimensional graphics gradation data by setting color information of a vertex including a side of the three-dimensional polygon which is perpendicular to the direction of gradation based on color information of a color reference point of two-dimensional graphic gradation regarding the side.

5. The apparatus according to claim 1, wherein the obtaining unit further obtains shape information about an object to which the two-dimensional graphic gradation is applied, and
wherein a plurality of triangles generated by dividing a rectangle encircling an object obtained based on the shape information of the object is three-dimensional polygons, and the conversion unit converts the two-dimensional graphics gradation data into the three-dimensional graphics gradation data by setting, based on position information of each of the three-dimensional polygons and the color information of color reference points, color of the color reference point to a vertex of each of the three-dimensional polygons.

6. The apparatus according to claim 5, wherein the analyzing unit obtains a rectangle circumscribed around the object based on the shape information, and
wherein the conversion unit comprises:
a rectangle calculating unit configured to calculate a rectangle formed by straight lines parallel with and perpendicular to the direction and encircling the circumscribed rectangle, as a rectangle encircling the object;
a straight line calculating unit configured to calculate straight lines perpendicular to the direction and passing through the color reference points;
a generating unit configured to generate, as three-dimensional polygons, a plurality of triangles by dividing the rectangle along the straight lines, and by further dividing the plurality of rectangles generated by the division; and
a color designating unit configured to designate a color of a color reference point, through which a side of each three-dimensional polygon perpendicular to the direction passes, as colors of two ends of the side.

7. A method comprising:
obtaining information of a color changing direction of gradation of two-dimensional graphics gradation data and color information about color reference points of the gradation; and
converting the two-dimensional graphics gradation data into three-dimensional graphics gradation data,
wherein the converting converts the two-dimensional graphics gradation data into the three-dimensional graphics gradation data using the direction information of gradation and the color information about color reference points, and
wherein the converting generates a rectangle encircling a circumscribed rectangle using lines perpendicular and using lines parallel to the color changing direction of the gradation, and converts the two-dimensional graphics gradation data into the three-dimensional graphics gradation data using the rectangle.

8. The method according to claim 7, further comprising:
obtaining shape information about an object to which the two-dimensional graphic gradation is applied, and
setting an area where graphics gradation data is drawn by gradation out of the three-dimensional graphics gradation data obtained by conversion, based on the shape information.

9. The method according to claim 7, further comprising rendering the three-dimensional graphics gradation data.

10. The method according to claim 7, wherein a triangle generated using the direction information of gradation is used as a three-dimensional polygon, and the converting converts the two-dimensional graphics gradation data into the three-dimensional graphics gradation data by setting color information of a vertex including a side of the three-dimensional polygon which is perpendicular to the direction of gradation based on color information of a color reference point of two-dimensional graphic gradation regarding the side.

11. The method according to claim 7, wherein the obtaining further obtains shape information about an object to which the two-dimensional graphic gradation is applied, and
wherein a plurality of triangles generated by dividing a rectangle encircling an object obtained based on the shape information of the object is three-dimensional polygons, and the converting converts the two-dimensional graphics gradation data into the three-dimensional graphics gradation data by setting, based on position information of each of the three-dimensional polygons and the color information of color reference points, color of the color reference point to a vertex of each of the three-dimensional polygons.

12. The method according to claim 11, further comprising obtaining a rectangle circumscribed around the object based on the shape information, and
wherein the converting comprises:
calculating a rectangle formed by straight lines parallel with and perpendicular to the direction and encircling the circumscribed rectangle, as a rectangle encircling the object;
calculating straight lines perpendicular to the direction and passing through the color reference points;
generating, as three-dimensional polygons, a plurality of triangles by dividing the rectangle along the straight lines, and by further dividing the plurality of rectangles generated by the division; and
designating a color of a color reference point, through which a side of each three-dimensional polygon perpendicular to the direction passes, as colors of two ends of the side.

13. A non-transitory computer-readable medium storing a control program for causing a computer to execute a method comprising:
obtaining information of a color changing direction of gradation of two-dimensional graphics gradation data and color information about color reference points of the gradation; and
converting the two-dimensional graphics gradation data into three-dimensional graphics gradation data,
wherein the converting converts the two-dimensional graphics gradation data into the three-dimensional graphics gradation data using the direction information of gradation and the color information about color reference points, and
wherein the converting generates a rectangle encircling a circumscribed rectangle using lines perpendicular and using lines parallel to the color changing direction of the gradation, and converts the two-dimensional graphics gradation data into the three-dimensional graphics gradation data using the rectangle.

14. The non-transitory computer-readable medium according to claim 13, further comprising:
obtaining shape information about an object to which the two-dimensional graphic gradation is applied, and
setting an area where graphics gradation data is drawn by gradation out of the three-dimensional graphics gradation data obtained by conversion, based on the shape information.

15. The non-transitory computer-readable medium according to claim 13, further comprising rendering the three-dimensional graphics gradation data.

16. The non-transitory computer-readable storage medium according to claim 13, wherein a triangle generated using the direction information of gradation is used as a three-dimensional polygon, and the converting converts the two-dimensional graphics gradation data into the three-dimensional graphics gradation data by setting color information of a vertex including a side of the three-dimensional polygon which is perpendicular to the direction of gradation based on color information of a color reference point of two-dimensional graphic gradation regarding the side.

17. The computer-readable storage medium according to claim 13, wherein the obtaining further obtains shape information about an object to which the two-dimensional graphic gradation is applied, and
wherein a plurality of triangles generated by dividing a rectangle encircling an object obtained based on the shape information of the object is three-dimensional polygons, and the converting converts the two-dimensional graphics gradation data into the three-dimensional graphics gradation data by setting, based on position information of each of the three-dimensional polygons and the color information of color reference points, color of the color reference point to a vertex of each of the three-dimensional polygons.

18. The non-transitory computer-readable medium according to claim 17, further comprising obtaining a rectangle circumscribed around the object based on the shape information, and
wherein the converting comprises:
calculating a rectangle formed by straight lines parallel with and perpendicular to the direction and encircling the circumscribed rectangle, as a rectangle encircling the object;
calculating straight lines perpendicular to the direction and passing through the color reference points;
generating, as three-dimensional polygons, a plurality of triangles by dividing the rectangle along the straight lines, and by further dividing the plurality of rectangles generated by the division; and
designating a color of a color reference point, through which a side of each three-dimensional polygon perpendicular to the direction passes, as colors of two ends of the side.

* * * * *